United States Patent Office 2,852,217
Patented Sept. 16, 1958

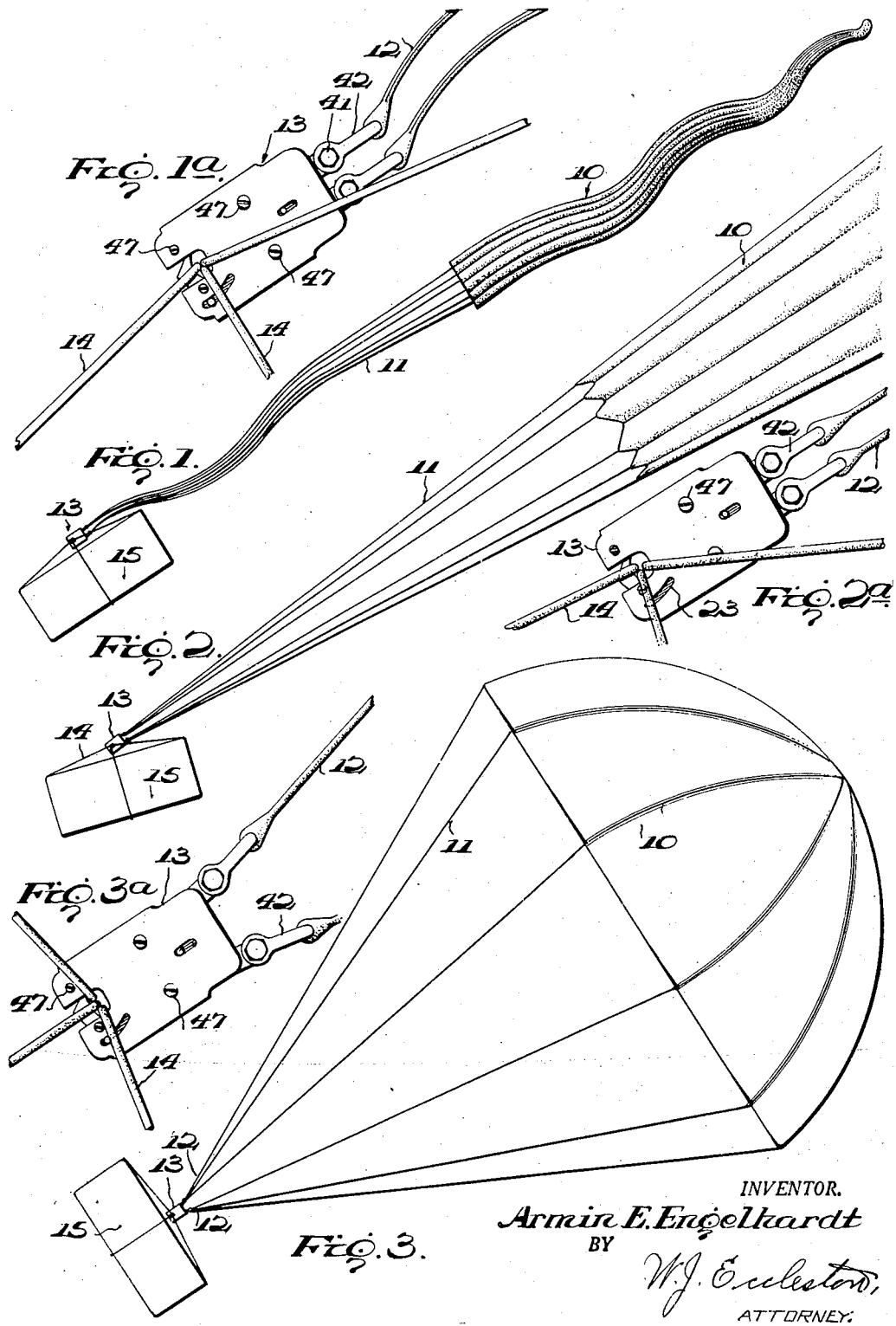

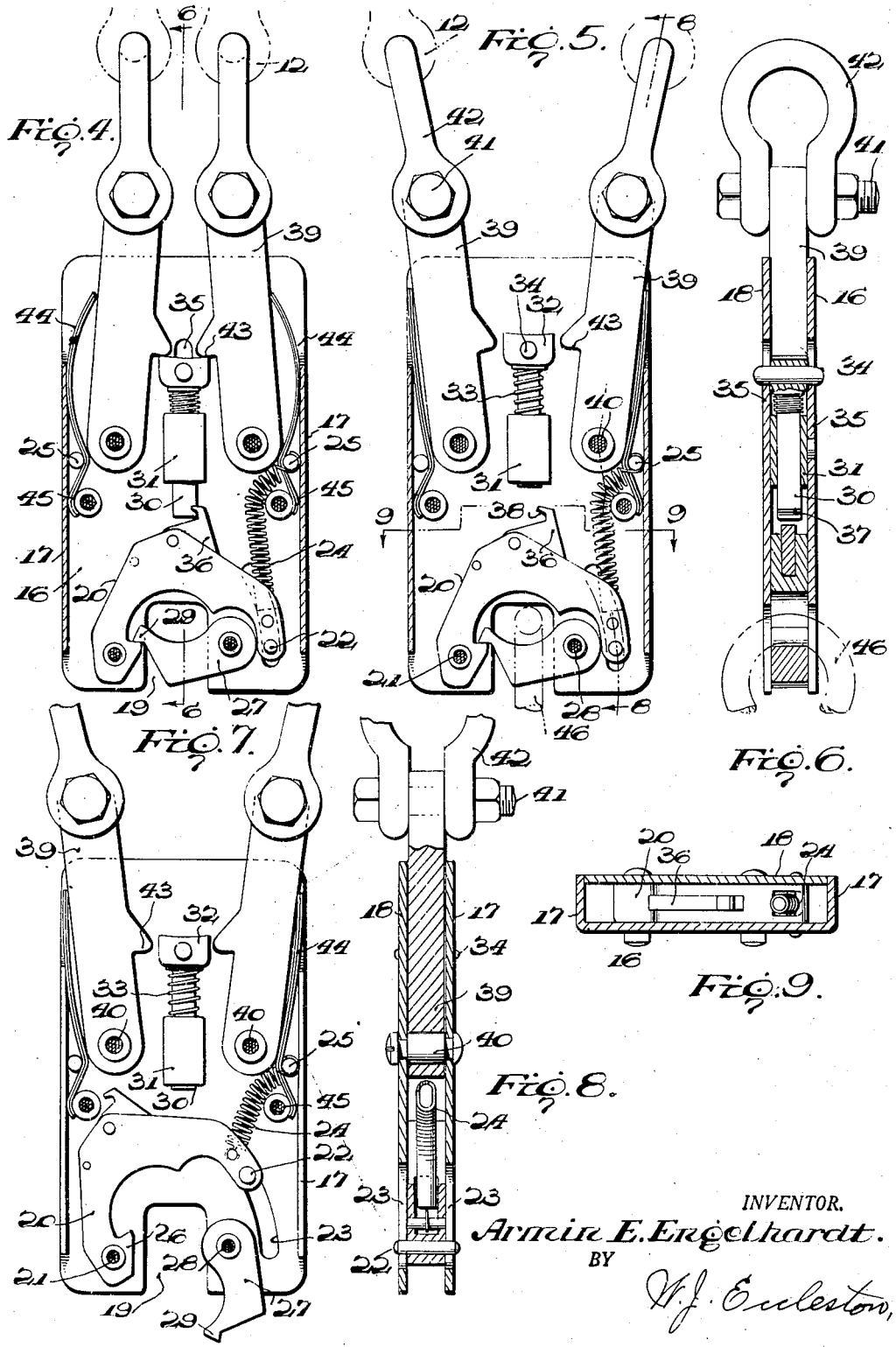

2,852,217

PARACHUTE CONTROLLED DISCONNECT

Armin E. Engelhardt, Chicago, Ill., assignor to the United States of America as represented by the Secretary of the Army Application January 11, 1956, Serial No. 558,594

9 Claims. (Cl. 244—151)

(Granted under Title 35, U. S. Code (1952), sec. 266)

The invention described herein, if patented, may be manufactured and used by or for the Government for governmental purposes, without the payment to me of any royalty thereon.

The present invention relates to the dropping of loads to be lowered from aircraft by means of parachutes connected to the loads, and more particularly to means for disconnecting the parachutes from the loads.

In the dropping of loads by means of parachutes, it is important that the load be disconnected from the parachute immediately upon contact with the ground, so that the load will not be dragged by the parachute. It is even more important however, that the load not be prematurely released, and to this end various delaying or timing safety devices have been employed to prevent release of the load from the parachute during the initial descent of the load. Such devices are usually complicated and often are not positive or entirely reliable in action, resulting at times in premature release and at other times, preventing release after contact of the load with the ground.

An important object of the present invention is the provision of a safety device which is positively operated by the parachute when it becomes completely deployed, to set or arm the disconnect for automatic release of the load when it contacts the ground.

Another object of the invention is to provide a safety device of this character which is of simple construction, certain in operation and capable of withstanding rough usage without impairment of its operation.

Other objects and advantages of the invention will be apparent during the course of the following description.

In the accompanying drawings which form a part of this specification and wherein like characters of reference denote like parts throughout, Figure 1 is an elevation of a parachute and its load in the air during the initial stage of deployment, Figure 1a is an enlarged detail view of the disconnect in such stage of deployment, Figure 2 is an elevational of the load and a portion of the parachute as the parachute begins to fill with air, Figure 2a is an enlarged view of the disconnect in such intermediate stage of deployment, Figure 3 is an elevation of the load and parachute as the parachute reaches the stage of complete deployment, Figure 3a is an enlarged detail view of the disconnect in such complete stage of deployment, Figure 4 is a side elevation of the disconnect with its side plate removed, the parts being in the safe position, Figure 5 is a similar view of the disconnect showing the parts in the armed position, Figure 6 is a longitudinal sectional view taken on the line 6—6 of Figure 4, Figure 7 is a view similar to Figures 4 and 5 but showing the parts in disconnect position, Figure 8 is a longitudinal section taken on the line 8—8 of Figure 5, and Figure 9 is a cross section taken on line 9—9 of Figure 5.

In the drawings, wherein for the purpose of illustration is shown a preferred embodiment of the invention, the numeral 10 designates a parachute having the usual shroud lines 11 attached to the usual risers or webs 12. Each riser 12 is connected to the lines on one side of the parachute, constituting half of the total number of shroud lines as illustrated in Figure 3, this arrangement being customary. The risers 12 are connected to a disconnect indicated generally by numeral 13 which is also connected by suitable straps or the like 14 to the load 15 to be dropped.

The disconnect assembly indicated by the numeral 13 comprises an upper safety mechanism adapted to cooperate with the lower disconnect mechanism, as illustrated in the three stages of operation seen in Figures 4, 5, and 7. The disconnect casing is generally rectangular and somewhat flat in shape, comprising a back plate 16 provided with upstanding flanges 17 extending along its longitudinal side edges and terminating at points spaced a substantial distance below the top of plate, and a front plate 18 suitably secured to the flanges 17 in spaced relation to the back plate.

The plates 16 and 18 are each provided centrally of their lower edges with aligned substantially deep reentrant notches 19 adapted to receive the rings, cords, or straps which support the load 15. A generally inverted U-shaped load-supporting lever 20 is journaled at one end on shaft 21 which is disposed between the plates 16 and 18 at a point adjacent to but spaced from the lower end of notch 19, on the left of the notch as viewed in Figures 4, 5 and 7. The opposite end of lever 20 is provided with a transverse pin 22 which projects outwardly from both faces of the lever and into arcuate slots 23 formed in plates 16 and 18 on the side of notches 19 opposite to the shaft 21, the arc of slots 23 having for its center the axis of shaft 21. With this arrangement the lever 20 is normally free to pivot about shaft 21 to the extent of the length of the slot. A coil spring 24 is secured at one end to the lever 20 adjacent its pin 22 and at its other end to a stud 25 disposed on plate 16 near the center of one side edge thereof. The spring 24 normally urges the lever 20 to its upper position illustrated in Figure 7 in which the pin 22 engages the upper ends of the arcuate slots 23. The left or pivoted end of lever 20 is formed on its inner side adjacent notches 19 in the shape of a load supporting hook 26 having its hook or shoulder portion disposed in substantially a horizontal plane spaced above the axis of shaft 21 when the lever is in its lower position shown in Figures 4 and 5. A short load-engaging lever 27 is journaled at one end on shaft 28 located between notch 19 and slot 23 and at a point a short distance above the level of the axis of shaft 21. The opposite or left end of lever 27 is provided with a short projecting head 29 adapted to engage and rest upon the hook portion 26 of lever 20 in its operative position, as shown in Figures 4 and 5. The top of the lever 27 is curved downwardly so that the load ring will tend to remain in the center of the short lever 27.

It will be seen that due to the location of the hook 26 on the inside of shaft 21, the weight of the load on lever 27 and hook 26 will maintain the lever 20 in its lower position against the tension of coil spring 24, and that when the weight of the load is removed from lever 27, the spring 24 will pivot lever 20 about shaft 21, thereby moving hook 26 out from under the short head 29 and permitting lever 27 to swing downwardly into the position shown in Figure 7, releasing the load. In order to prevent the releasing operation of the levers during the no-load period between dropping of the load from the aircraft and full deployment of the parachute when the full weight of the load will be exerted upon the disconnect lever 27, it is necessary to prevent upward movement of lever 20 by the action of coil spring 24 until such time as the weight of the load can be counted upon to maintain the operative lowering position of the levers. To this end the upper safety mechanism has been provided to prevent premature operation of the disconnect levers.

The safety mechanism comprises an interlock in the form of a vertical plunger 30 slidably supported for vertical movement in a sleeve 31 secured to plate 16 midway between its side edges. The top of the plunger is provided with an enlarged head 32 having a slightly dished upper surface, there being a coil spring 33 disposed about the body of the plunger between the head 32 and the top of supporting sleeve 31 and operative to normally urge the plunger upwardly. A cross-pin 34 extends transversely through the plunger head 32 and beyond the head into vertical slots 35 in the plates 16 and 18. The slots 35 serve to guide and limit the movement of the plunger to prevent its removal from the sleeve 31. An abutment 36 is secured to the upper portion of lever 20 to the right of its center and normally engages the lower end of plunger 30 when the plunger is in its lower or retracted position. A transverse groove 37 is arranged in the lower portion of the plunger to be engaged by the end of the abutment, and the groove 37 is provided with a lower inclined surface to engage a similarly inclined surface 38 on the abutment so that the action of plunger spring 33 will act through the inclined surfaces to cam the lever abutment out of the way of the plunger to permit raising of the plunger to its upper position shown in Figures 5 and 6.

Arms 39 are arranged on each side of plunger sleeve 31, being journaled on shafts 40 connecting the plates 16 and 18 approximately midway between the sleeve 31 and plate flanges 17. The arms 39 extend outwardly a substantial distance beyond the ends of plates 16 and 18 where they are connected at their ends by bolts 41 to the usual clevises 42 which in turn are connected to the risers 12. The inner edge of each arm 39 is provided with a projecting shoulder 43 adapted to act as a detent to engage the top surface of plunger head 32 in the inner position of the arms to hold it in its lower position against the tension of the plunger spring 33. Cantilever type outwardly curved leaf springs 44 are disposed between the arms 39 and plate flanges 17, being held in place by their ends which are passed between two closely spaced shafts 25 and 45. The springs 44 urge the arms 39 inwardly so that when the arms are in the safety position shown in Figure 4 with the plunger head 32 held beneath the shoulders 43, the plunger can only be released for upward movement by moving the arms outwardly against the tension of the leaf springs 44.

In operation, the load supporting member 46, which may be a ring or the like secured to the load straps 14, is inserted into the notches 19 in the disconnect, the levers 20 and 27 are moved to their operative holding position shown in Figures 4 and 5, the plunger 30 is moved downwardly against its spring tension to a position in front of lever abutment 36 which is allowed to move into contact with plunger groove 37, and the arms 39 are then moved together so that the shoulders 43 extend over the top of plunger head 32 to block its upward movement, the leaf springs 44 maintaining such locked or safe position of the arms 39. So long as either arm 39 remains in its safe position with its shoulder 43 engaging the plunger head 32, the plunger will be locked in safe position in front of lever abutment 36 and the lever hook portion 26 will remain in position below head 29 of lever 27 and prevent its downward movement to the disconnect or release position. When the load is dropped from an aircraft, the arms 39 will remain in their safe or substantially parallel position during the no-load period of the drop illustrated in Figures 1, 1a, 2 and 2a during which period the parachute 10 has not filled completely with air. However, when the parachute fills and reaches the position of full deployment shown in Figure 3, the parachute shroud lines draw the risers 12 outwardly to the divergent position illustrated in Figures 3 and 3a, and as the weight of the load is applied to the risers, the arms 39 will be drawn outwardly to their armed or non-safe position illustrated in Figures 3a, 5 and 7. From the time of full deployment of the parachute, the weight of the load will remain upon the lever 27 of the disconnect so that although movement of arms 39 apart has released plunger 30 and permitted it to move out of the path of lever abutment 36, the weight exerted upon lever hook 26 cannot be overcome by the tension of coil spring 24 and the two levers 20 and 27 will remain in their armed but load supporting position illustrated in Figure 5. As soon however, as the load contacts the ground or other supporting surface, its weight will be relieved from lever 27 and lever hook 26, whereupon the coil spring 24 will instantaneously raise lever 20 about its journal 21, thereby swinging hook 26 out from under the end of lever 27 which then falls of its own weight, releasing the load from the disconnect. This release position of the parts is shown in Figure 7.

The plate 18 may be secured to plate 16 in any suitable manner, one method being by means of bolts 47 passing through the plate 18 into threaded bores in shafts 21, 28 and 40. It is not necessary to remove plate 18 to reset the disconnect and safety, as the plunger 30 may be set by means of pin 34 extending into slots 35 and lever 20 may be set by means of pin 22 extending into slots 23. Due to the slots, these pins are accessible to a tool operated from outside of the plates 16 and 18.

A very important feature of the present invention is the operation of the safety or arming mechanism by means of the parachute itself as it reaches full deployment, thereby dispensing with timing devices of various kinds, and assuring positive operation of the arming mechanism with full assurance that the no-load period has passed. Because of the positive action of the parachute in arming the disconnect, there is no necessity for setting a timing mechanism before the drop. Although specific forms of disconnect mechanism and safety mechanism have been shown and described, other embodiments may obviously be employed, and in its broad aspects the present invention consists in the utilization of the divergence of the shroud lines and risers brought about by the full deployment of the parachute to arm a disconnect mechanism of any form for positive operation when relieved of the weight of its load by contact of such load with the ground.

While I have shown and described the preferred embodiment of the invention, it is to be understood that various changes in the form and arrangement of parts may be made without departing from the spirit of the invention or the scope of the subjoined claims.

I claim:

1. The combination with a parachute having shroud lines, a load to be dropped by the parachute, and a disconnect arranged between the parachute and the load for releasing the load from the parachute when the weight of the load is removed from the disconnect by contact of the load with the ground, of a safety mechanism operatively associated with said disconnect to prevent the operation thereof and connected to the shroud lines of the parachute, and means carried by the disconnect and movable laterally with respect to said disconnect and operatively connected to the shroud lines to be moved laterally by pronounced divergence of the shroud lines to render the safety mechanism inoperative.

2. The combination with a parachute having shroud lines, a pair of risers, each riser connected to some of the shroud lines of the parachute, a load to be dropped by the parachute, and a disconnect arranged between the parachute and the load for releasing the load from the parachute when the weight of the load is removed from the disconnect, of a safety mechanism operatively associated with the disconnect to prevent operation thereof, and means carried by the disconnect and movable laterally with respect to said disconnect and operatively connected to said risers to be moved laterally by pronounced separation of said risers caused by full deployment of the parachute to render the safety mechanism inoperative.

3. The combination with a parachute having shroud lines, a load to be dropped by the parachute, and a disconnect arranged between the parachute and the load for releasing the load from the parachute when the weight of the load is removed from the disconnect, of a safety interlock operatively associated with said disconnect to prevent premature operation thereof and movable from an inoperative position to an operative safety position, a pair of arms associated with said interlock and mounted for movement toward and away from each other to engage and maintain the interlock in its operative safety position in the adjacent position of the arms, said arms being connected to shroud lines on opposite sides of the parachute whereby full deployment of the parachute will move the arms apart to release the interlock, and means normally urging the interlock towards its inoperative position.

4. The combination with a parachute having shroud lines, a load to be dropped by the parachute, and a disconnect arranged between the parachute shroud lines and the load to release the load from the parachute when the weight of the load is removed from the disconnect, of a safety interlock operatively associated with said disconnect and movable from an inoperative position to an operative safe position in which it prevents operation of the disconnect to release the load, means normally urging the interlock to its inoperative position, detent mechanism carried by said disconnect and movable laterally with respect to said disconnect from an operative safe position in engagement with the interlock to an inoperative position, and means connecting the detent mechanism to the shroud lines on opposite sides of the parachute and operable to move the detent mechanism laterally to its inoperative position upon the shroud lines being separated to assume a divergent position incident to full deployment of the parachute.

5. The combination with a parachute having shroud lines, a load to be dropped by the parachute, and a disconnect arranged between the parachute shroud lines and the load to release the load from the parachute when the weight of the load is removed from the disconnect, of a safety interlock operatively associated with said disconnect and movable from an inoperative position to an operative safe position in which it prevents operation of the disconnect to release the load, means normally urging the interlock to its inoperative position, detent mechanism movable from an operative safe position in engagement with the interlock to an inoperative position, said detent mechanism including a pair of arms pivotally secured to said disconnect and provided with detents for engagement with the interlock when the arms are moved to a position adjacent each other, and means connecting the arms to the shroud lines at points on the arms spaced a substantial distance from their pivot points whereby the arms will be separated to release the interlock upon the shroud lines assuming a divergent position incident to full deployment of the parachute.

6. The combination with a parachute having shroud lines, a load to be dropped by the parachute, and a disconnect arranged between the parachute shroud lines and the load to release the load from the parachute when the weight of the load is removed from the disconnect, of a safety interlock operatively associated with said disconnect and movable from an inoperative position to an operative safe position in which it prevents operation of the disconnect to release the load, the interlock being normally urged toward its inoperative position, a pair of arms pivotally secured to the disconnect and provided with detents for engagement with the interlock when the arms are moved to a safe position adjacent each other to maintain the interlock in its operative safe position, resilient means normally urging the arms to their adjacent safe position, and means connecting the arms to the shroud lines at points on the arms spaced a substantial distance from their pivot points, whereby the arms will be separated against the tension of the resilient means to release the interlock upon the shroud lines assuming a divergent position incident to the full deployment of the parachute.

7. The combination with a parachute having shroud lines, and a load to be dropped by the parachute, of a disconnect arranged between the parachute shroud lines and the load to release the load from the parachute when the weight of the load is removed from the disconnect, said disconnect comprising a frame, a load supporting lever pivoted adjacent one end to the frame and movable about its pivot from an operative to an inoperative position, resilient means urging the lever to its inoperative position, said lever having a load supporting shoulder so disposed with relation to the lever pivot axis that a load imposed on the shoulder urges the lever towards its operative position, a load engaging lever pivoted at one end to the frame and movable from an inoperative position to an operative position engaging said load supporting lever shoulder to transmit the weight of the load to said shoulder, an abutment on the load supporting lever, a safety plunger movable into engagement with the abutment to prevent movement of the load supporting lever to its inoperative position, means urging the safety plunger to an inoperative position out of contact with the abutment, detent mechanism movable from an operative safe position in engagement with the plunger to an inoperative position out of engagement therewith, and means connecting the detent mechanism to the parachute shroud lines on opposite sides of the parachute and operable to move the detent mechanism to its inoperative position when the shroud lines are separated to a divergent position incident to full deployment of the parachute.

8. The combination with a parachute having shroud lines, and a load to be dropped by the parachute, of a disconnect arranged between the shroud lines and the load to release the load from the parachute when the weight of the load is removed from the disconnect, said disconnect comprising a frame, a load supporting lever pivoted adjacent one end to the frame and movable about its pivot from an operative to an inoperative position, resilient means urging the lever to its inoperative position, said lever having a load supporting shoulder so disposed with relation to the lever pivot axis that a load imposed on the shoulder urges the lever towards its operative position, a load engaging lever pivoted at one end to the frame and in its operative position engaging said load supporting lever shoulder to transmit the weight of the load to said shoulder, an abutment on the load supporting lever, a safety plunger movable into engagement with the abutment to prevent movement of the load supporting lever to its inoperative position, means urging the safety plunger to an inoperative position out of contact with the abutment, a pair of arms pivotally mounted on the frame and provided with detents adapted to engage the safety plunger when the arms are moved to a safe position adjacent each other to maintain the plunger in its operative safe position, resilient means normally urging the arms to their adjacent safe position, and means connecting the arms to the shroud lines at points on the arms spaced a substantial distance from their pivot points, whereby the arms will be separated against the tension of the resilient means to release the safety plunger when the shroud lines assume a divergent position incident to the full deployment of the parachute.

9. The combination with a parachute, and a load to be dropped by the parachute, of a disconnect arranged between the parachute and the load for releasing the load from the parachute when the load contacts the ground, said disconnect comprising a pair of relatively movable load supporting members normally urged towards a load releasing position but maintained in a load supporting position by the weight of the load, a safety mechanism operatively associated with said members to prevent their movement to a release position, and laterally movable means carried by the disconnect and operatively connecting the safety mechanism to shroud lines on opposite sides of the parachute to be actuated by movement of the shroud lines away from each other in a lateral direction to render the safety mechanism inoperative when the shroud lines are separated by the parachute reaching full deployment.

References Cited in the file of this patent

UNITED STATES PATENTS

| | | |
|---|---|---|
| 1,017,767 | Kraftsik | Feb. 20, 1912 |
| 2,603,524 | Amelung | July 15, 1952 |
| 2,665,163 | Cross | Jan. 5, 1954 |

FOREIGN PATENTS

| | | |
|---|---|---|
| 143,348 | Great Britain | Sept. 15, 1919 |